United States Patent
Luo et al.

(10) Patent No.: US 10,613,489 B2
(45) Date of Patent: Apr. 7, 2020

(54) METHOD AND SYSTEM FOR DETERMINING OPTIMAL COEFFICIENTS OF CONTROLLERS FOR AUTONOMOUS DRIVING VEHICLES

(71) Applicant: Baidu USA LLC, Sunnyvale, CA (US)

(72) Inventors: Qi Luo, Sunnyvale, CA (US); Qi Kong, Sunnyvale, CA (US); Fan Zhu, Sunnyvale, CA (US); Xiang Yu, Sunnyvale, CA (US); Sen Hu, Sunnyvale, CA (US); Li Zhuang, Sunnyvale, CA (US); Weicheng Zhu, Sunnyvale, CA (US); Guang Yang, San Jose, CA (US); Jingao Wang, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 197 days.

(21) Appl. No.: 15/627,970

(22) Filed: Jun. 20, 2017

(65) Prior Publication Data

US 2018/0364657 A1 Dec. 20, 2018

(51) Int. Cl.
*G05B 13/04* (2006.01)
*G05D 1/02* (2020.01)
(Continued)

(52) U.S. Cl.
CPC ......... *G05B 13/044* (2013.01); *G05B 13/024* (2013.01); *G05D 1/0088* (2013.01); *G05D 1/0221* (2013.01); *G05D 2201/0212* (2013.01)

(58) Field of Classification Search
CPC ... G05B 13/044; G05D 1/0088; G05D 1/0221
See application file for complete search history.

(56) References Cited

U.S. PATENT DOCUMENTS

| 2004/0230325 A1* | 11/2004 | Ramamoorthy | G05B 13/042 700/37 |
| 2016/0214596 A1* | 7/2016 | Glugla | B60W 10/00 |
| 2019/0349254 A1* | 11/2019 | Nolan | H04L 67/12 |

OTHER PUBLICATIONS

Wikipedia article on "particle swarm optimization" as of Jun. 7, 2017, retrieved from https://en.wikipedia.org/w/index.php?title=Particle_swarm_optimization&oldid=784351367 (Year: 2017).*

* cited by examiner

*Primary Examiner* — Tyler J Lee
(74) *Attorney, Agent, or Firm* — Womble Bond Dickinson (US) LLP

(57) ABSTRACT

Driving parameters (e.g., speed, heading direction) that an autonomous driving vehicle (ADV) likely utilize as target driving parameters are grouped into a number of ranges and one of the driving parameters in each range is selected as a driving parameter representative or a target driving parameter representing the respective range or segment. For each of the target driving parameters representing the ranges, a particle swarm optimization method is utilized to derive a set of most optimized coefficients for a controller (e.g., speed controller, steering controller) for controlling an ADV. A driving parameter to coefficient (parameter/coefficient) mapping table is generated to map a particular driving parameter representing a range of driving parameter to a set of one or more coefficients of a particular controller. The parameter/coefficient mapping table is utilized at real-time to configure a controller in response to a particular target driving parameter using the corresponding coefficients.

22 Claims, 10 Drawing Sheets

(51) Int. Cl.
*G05B 13/02* (2006.01)
*G05D 1/00* (2006.01)

METHOD AND SYSTEM FOR DETERMINING OPTIMAL COEFFICIENTS OF CONTROLLERS FOR AUTONOMOUS DRIVING VEHICLES

TECHNICAL FIELD

Embodiments of the present disclosure relate generally to operating autonomous vehicles. More particularly, embodiments of the disclosure relate to determining controller coefficients of a controller to control an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving of autonomous driving vehicles (ADVs). Conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

However, for different driving parameters such as speeds or heading directions, controller coefficients of a controller for controlling an ADV may be different. Tuning coefficients or gains of a controller for autonomous driving is painful. There are many coefficients for different controllers and mapping the coefficients and the driving parameters are not linear. Controller coefficients may deviate from optimal points as the vehicle parameters deteriorate. There has been a lack of efficient ways to fine tune the controller coefficients of controllers for autonomous driving.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
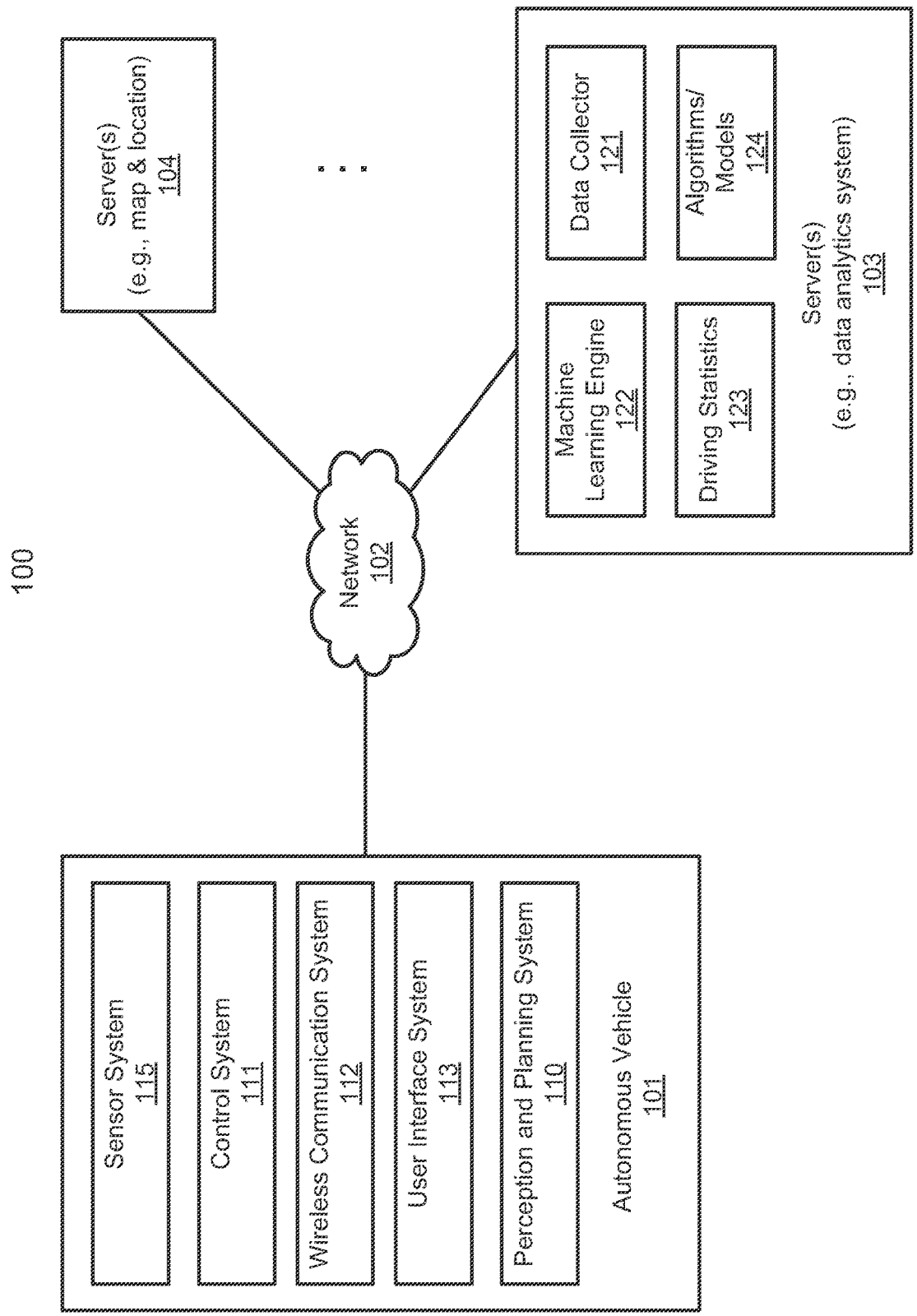
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, driving parameters (e.g., speed/velocity, heading direction) that an ADV likely utilize as driving parameters are divided or grouped into a number of ranges or segments (e.g., 1-10 meter per second or m/s, 10-20 m/s, or ranges of heading directions or turning angles in degrees or percentages, etc.) and one of the driving parameters in each range is selected as a driving parameter representative or a target driving parameter representing the respective range or segment. For each of the target driving parameters representing the ranges, a particle swarm optimization method is utilized to determine a set of most optimal coefficients for a controller (e.g., speed controller, steering controller) for controlling an ADV. A driving parameter to coefficient (parameter/coefficient) mapping table is generated to map a particular target driving parameter representing a range of driving parameters to a set of one or more controller coefficients of a particular controller. The parameter/coefficient mapping table is utilized at realtime to configure a controller in response to a particular target driving parameter using the corresponding controller coefficients.

According to one embodiment, for each of the target driving parameters, a set of controller coefficient candidates that are suitable for a controller of an ADV is determined. The controller coefficients are divided or grouped into a number of ranges (groups or segments) of controller coefficient candidates. Each range of controller coefficient candidates represents a local domain (also referred to as a local space or local search space) and all ranges as a whole represents a global domain (also referred to as a global space or global search space). For each local domain, a local best controller coefficient (or simply referred to as a local best coefficient) is determined based on all the controller coefficient candidates associated with the local domain using a cost function. A local best controller coefficient of a local domain represents the most optimal controller coefficient for the corresponding local domain.

Based on the local best controller coefficients of all local domains, a global best controller coefficient is determined. The global best controller coefficient represents the most optimal controller coefficient amongst all the local best controller coefficients of all the local domains, i.e., the global domain. The global best controller coefficient is then associated with the target driving parameter, which can be inserted into a mapping entry of a parameter/coefficient mapping table to be used in real-time or online for controlling the ADV. The above processes may be iteratively performed to determine a global best controller coefficient of a particular controller for each of the target driving parameters.

According to one embodiment, a controller coefficient is selected from a set of controller efficient candidates in a first predetermined range for controlling an ADV to drive with a first target parameter. The first target driving parameter is one of a number of target driving parameters representing a number of local domains. The first predetermined range represents a first local domain. A cost is calculated using a cost function based on the selected controller coefficient. A first local best controller coefficient is determined for the first local domain, such that the cost is minimized amongst the controller coefficient candidates of the set of the first predetermined range. A global best controller coefficient is determined based on the first local best controller coefficient in view of other local best controller coefficients of other ranges or other local domains. The above processes are iteratively performed to determine a local best controller coefficient for each of the local domains. The global best controller coefficient is then determined based on the local best controller coefficients of all local domains. The global best controller coefficient is utilized by a corresponding controller to control the ADV to drive with the first driving parameter. The above processes are iteratively performed to determine a global best controller coefficient for each of the target driving parameters representing the local domains.

In determining a local best controller coefficient, according to one embodiment, the cost associated with a currently selected controller coefficient is compared with a local best cost associated with a current local best controller coefficient of the respective local domain. The local best cost refers to a cost corresponding to the local best controller coefficient that is determined using the cost function. If it is determined that the cost of the currently selected controller coefficient is lower than the current local best cost, the current best controller coefficient is replaced with the currently selected controller coefficient and the cost of the selected controller coefficient is designated the local best cost. That is, the currently selected controller coefficient becomes the local best controller coefficient if its cost is lower than the cost of the existing local best controller coefficient. In addition, according to one embodiment, if the cost of the currently selected controller coefficient is lower than a global best cost corresponding to a current global best controller coefficient, the currently selected controller coefficient becomes the global best controller coefficient and the cost corresponding to the selected controller coefficient becomes the global best cost. The global best cost refers to the cost corresponding to the global best controller coefficient.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
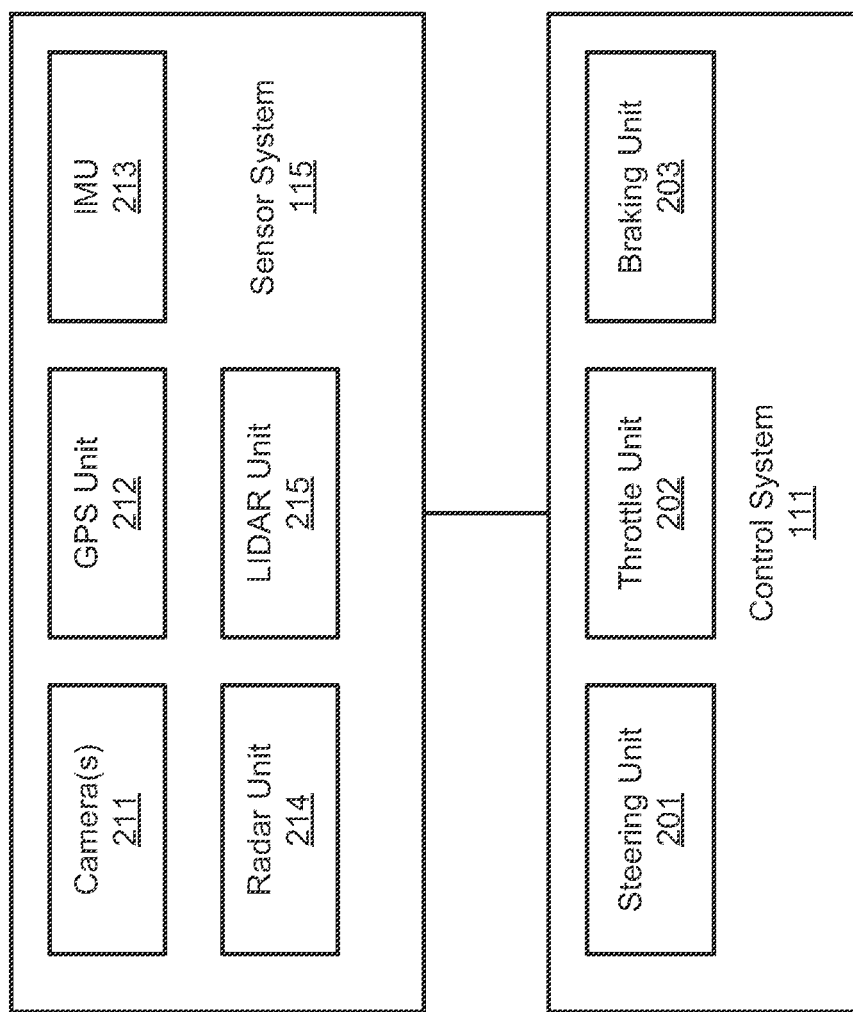
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms, rules, and/or predictive models 124 include one or more cost functions to determine optimal controller coefficients for various controllers, such as, for example, speed/velocity controllers and steering controllers, for controlling driving parameters (e.g., speed/velocity, heading direction) of autonomous driving vehicles. For a given target driving parameter or driving parameter representative, a cost function is utilized to determine one or more optimal controller coefficients of a controller, such that the cost of the function reaches minimum. In one embodiment, algorithms, rules, and/or predictive models 124 further include a formula for particle swarm optimization for iteration rates of controller coefficients (e.g., incremental updates of controller coefficients during the particle swarm optimization, which will be described in details further below.

The optimal controller coefficients are then utilized to configure the controller at run time to control an ADV to drive according to the associated target driving parameter. A target driving parameter or driving representative represents a predetermined range of driving parameters such as a range of speeds or a range of heading directions. Based on the optimal controller coefficients, a driving parameter to controller coefficient (parameter/coefficient) table is generated. The parameter/coefficient table includes a number of mapping entries. Each mapping entry maps a particular driving parameter or a range of driving parameters to a particular controller coefficient or a set of controller coefficients of a particular controller for autonomous driving. The parameter/coefficient tables are then uploaded to ADVs and are utilized to determine a set of one or more controller coefficients in response to a target driving parameter. A corresponding controller is then configured with the controller coefficients obtained from the parameter/coefficient table to control the autonomous driving of the ADVs.

Figure 3:
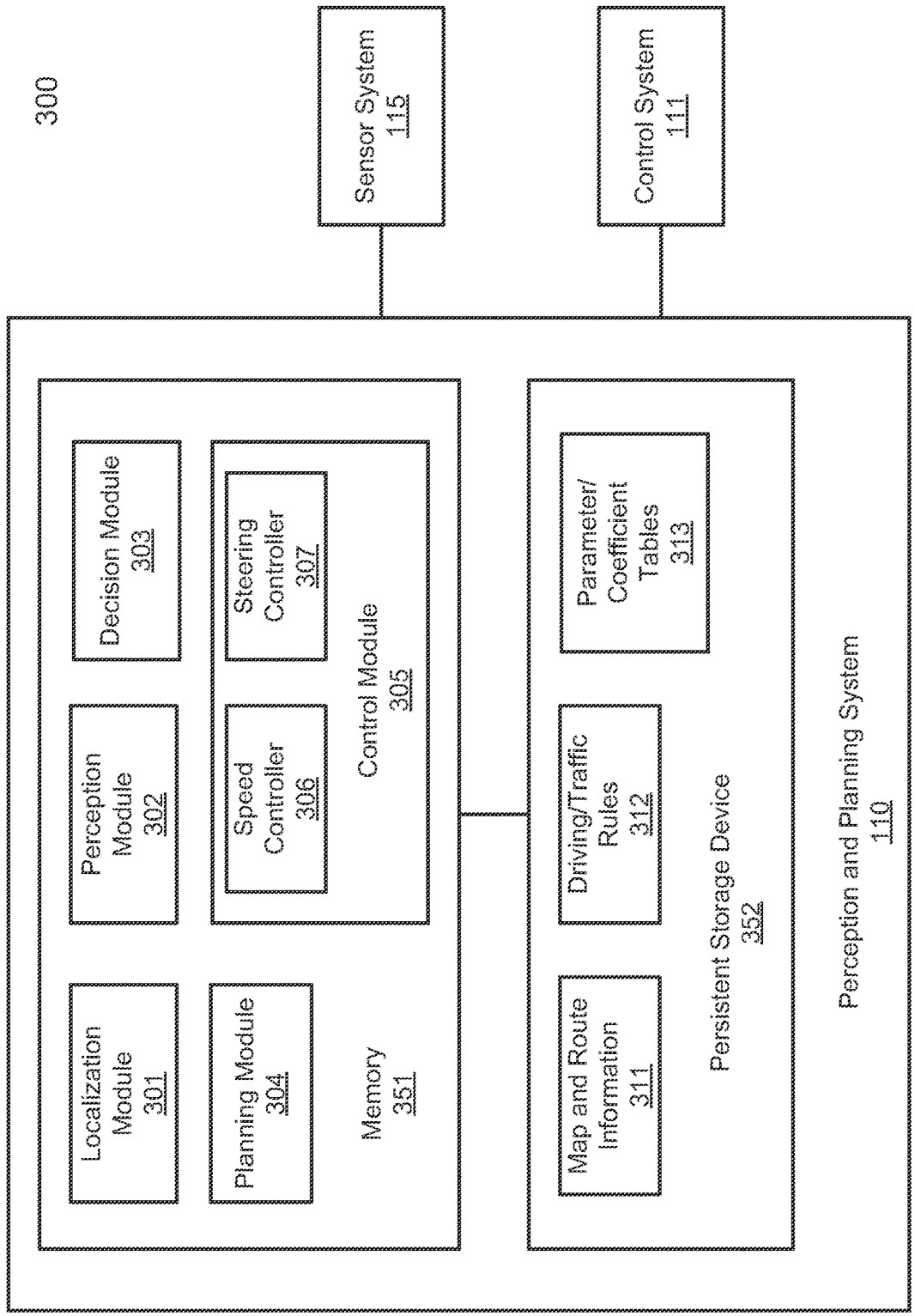
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, and control module 305.

Some or all of modules 301-305 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-305 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 304 plans a next route segment or path segment, for example, including a target position and the time required for the ADV to reach the target position. Alternatively, planning module 304 may further specify the specific speed, direction, and/or steering angle, etc. In one embodiment, planning module 304 plans a route segment or path segment for the next predetermined period of time such as 5 seconds. For each planning cycle, planning module 304 plans a target position for the current cycle (e.g., next 5 seconds) based on a target position planned in a previous cycle. Control module 305 then generates one or more control commands (e.g., throttle, brake, steering control commands) based on the planning and control data of the current cycle.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

In one embodiment, control module 305 includes a variety of controllers for controlling various driving parameters of the ADV including, for example, speed controller 306 and steering controller 307. Speed controller 306 is configured to control the speed of the ADV by generating and issuing speed control commands (e.g., throttle or brake commands), in response to planning and control data provided by planning module 304. Steering controller 307 is configured to control the heading directions of the ADV by generating and issuing steering commands, in response to planning and control data provided by planning module 304.

In one embodiment, speed controller 306 and/or steering controller 307 may include a proportional-integral-derivative controller (PID) controller. A PID is a control loop feedback mechanism (controller) commonly used in industrial control systems. A PID controller continuously calculates an error value as the difference between a desired set point (e.g., a target speed, target heading direction) and a measured process variable (e.g., actual speed, actual heading direction) and applies a correction based on proportional (Kp), integral (Ki), and derivative (Kd) terms. A PID controller continuously calculates an error value as the difference between a desired set point and a measured process variable and applies a correction based on proportional, integral, and derivative terms. The controller attempts to minimize the error over time by adjustment of a control variable to a new value determined by a weighted sum.

The PID controller may be modeled by proportional, integral, and derivative coefficients. These coefficients may be initially configured offline by a data analytics system based on a large amount of driving statistics, such as, for example data analytics system or server 103, as follows:

$$u(t) = K_p e(t) + K_i \int_0^t e(t) dt + K_d \frac{de(t)}{dt}$$

where $K_p$, $K_i$, and $K_d$ are the proportional, integral, and derivative coefficients of the PID controller. The error e(t) represents a difference between a target driving parameter (e.g., target speed, target heading direction) and an actual driving parameter measured in real-time in response to the control commands as planned.

In one embodiment, the controller coefficients Kp, Ki, and Kd may be configured differently in response to different driving parameters. For example, controller coefficients for speed controller 306 and a steering controller 307 may be different. For speed controller 306, different controller coefficients may be configured for different ranges of speeds (e.g., 0-10 m/s, 10-20 m/s). Similarly, for steering controller 307, different controller coefficients may be configured for different ranges of heading directions. The controller coefficients for different ranges of speeds or heading directions may be configured or mapped to different set of controller coefficients in parameter/coefficient mapping tables 313.

In one embodiment, parameter/coefficient mapping table 313 includes a number of mapping entries. Each mapping entry maps a particular range of driving parameters (or a driving parameter representative representing a range of driving parameters) to a set of one or more controller coefficients, in the example of a PID controller, coefficients Kp, Ki, and Kd. During the autonomous driving, in response to a target driving parameter (e.g., target speed, target heading direction), controller module 306 looks up in parameter/coefficient mapping table 313 based on the target driving parameter to obtain a set of one or more controller coefficients. The obtained controller coefficients are then utilized to configure a corresponding controller (e.g., speed controller 306, steering controller 307) for controlling the ADV. In one embodiment, parameter/coefficient mapping tables 313 include a speed parameter/coefficient mapping table, for example, as shown in FIG. 4A and a steering parameter/coefficient mapping table, for example, as shown in FIG. 4B.

Figure 4B:
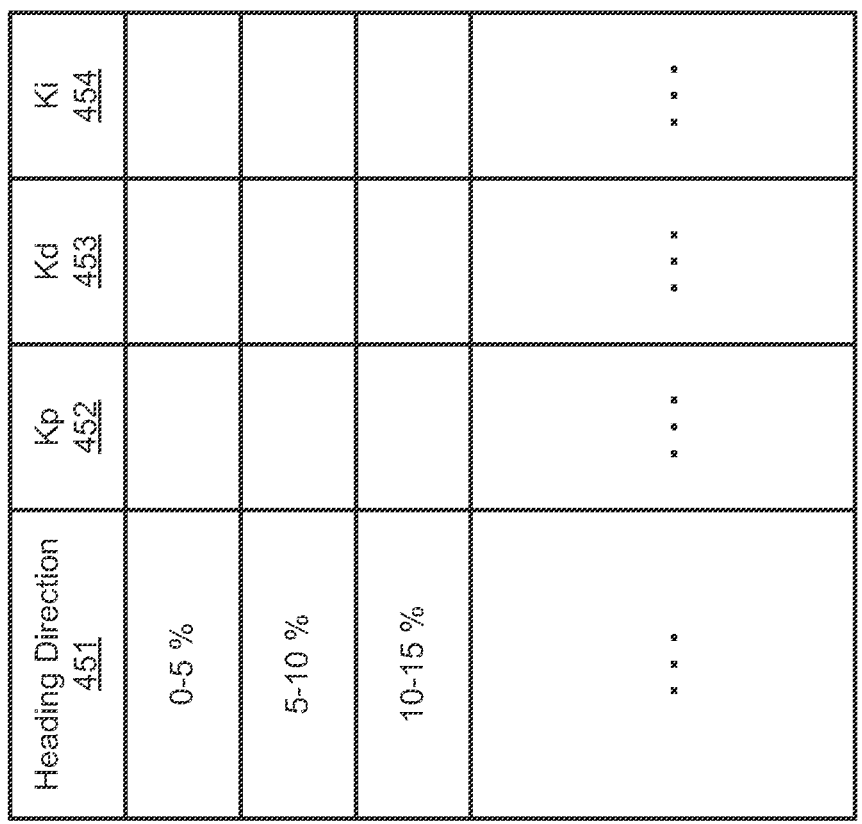
FIGS. 4A and 4B are diagrams illustrating examples of parameter/coefficient mapping tables according to certain embodiments.
Figure 4A:
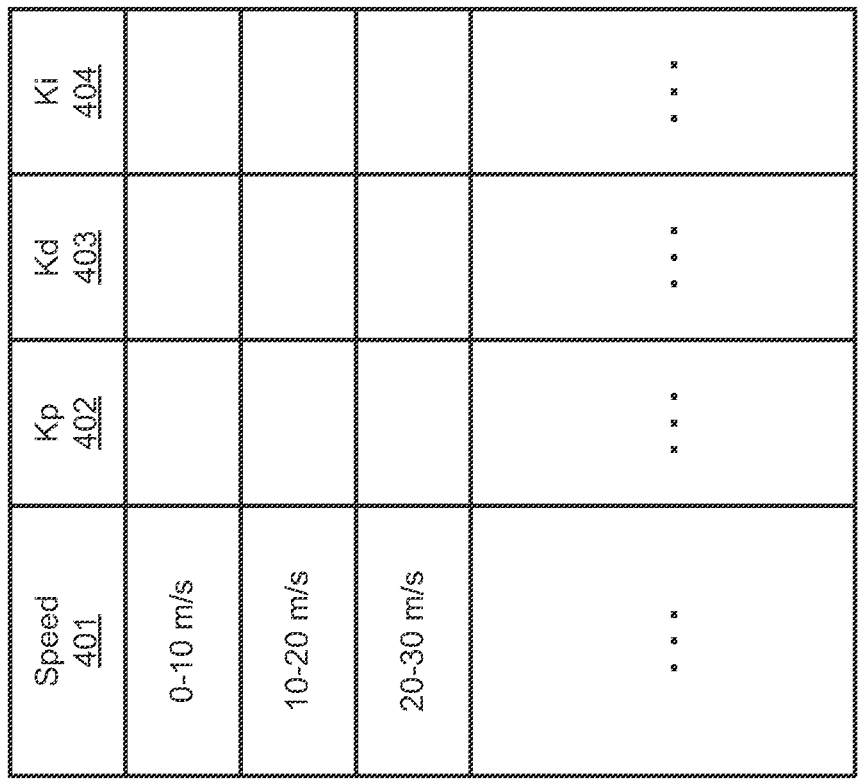

Referring to FIG. 4A, according to one embodiment, speed parameter/coefficient mapping table 400 includes a number of mapping entries. Each mapping entry maps a particular range of speed (or a speed representative representing a range of speeds) 401 to a set of one or more controller coefficients, such as, for example, Kp 402, Kd 403, and Ki 404 for a PID controller. The Kp 402, Kd 403, and Ki 404 are the global best Kp, Kd, and Ki respectively for the corresponding ranges or local domains. At run time, when control module 305 receives a target speed from planning module 304, control module 305 looks up in speed parameter/coefficient mapping table 400 based on the target speed via field 401 to locate a mapping entry having a range of speeds containing the target speed. Control module 305 then obtains a set of controller coefficients for speed controller 306 from fields 402-404 of the located mapping entry.

Referring to FIG. 4B, according to one embodiment, steering parameter/coefficient mapping table 450 includes a number of mapping entries. Each mapping entry maps a particular range of steering angles (or a steering angle representative representing a range of steering angles) 451 to a set of one or more controller coefficients, such as, for example, Kp 452, Kd 453, and Ki 454 for a PID controller. The Kp 452, Kd 453, and Ki 454 are the global best Kp, Kd, and Ki respectively for the corresponding ranges or local domains. A steering angle may be specified in degrees or percentages of a maximum turning angle. At run time, when control module 305 receives a target heading direction from planning module 304, control module 305 looks up in steering parameter/coefficient mapping table 450 based on the target heading direction via field 451 to locate a mapping entry having a range of heading directions containing the target heading direction. Control module 305 then obtains a set of controller coefficients for steering controller 307 from fields 452-454 of the located mapping entry. Note that formats or layouts of tables 400 and 450 as shown in FIGS.

4A and 4B are shown for the purpose of illustration only. Tables 400 and 450 can be implemented in a variety of other data structures or databases.

Figure 5:
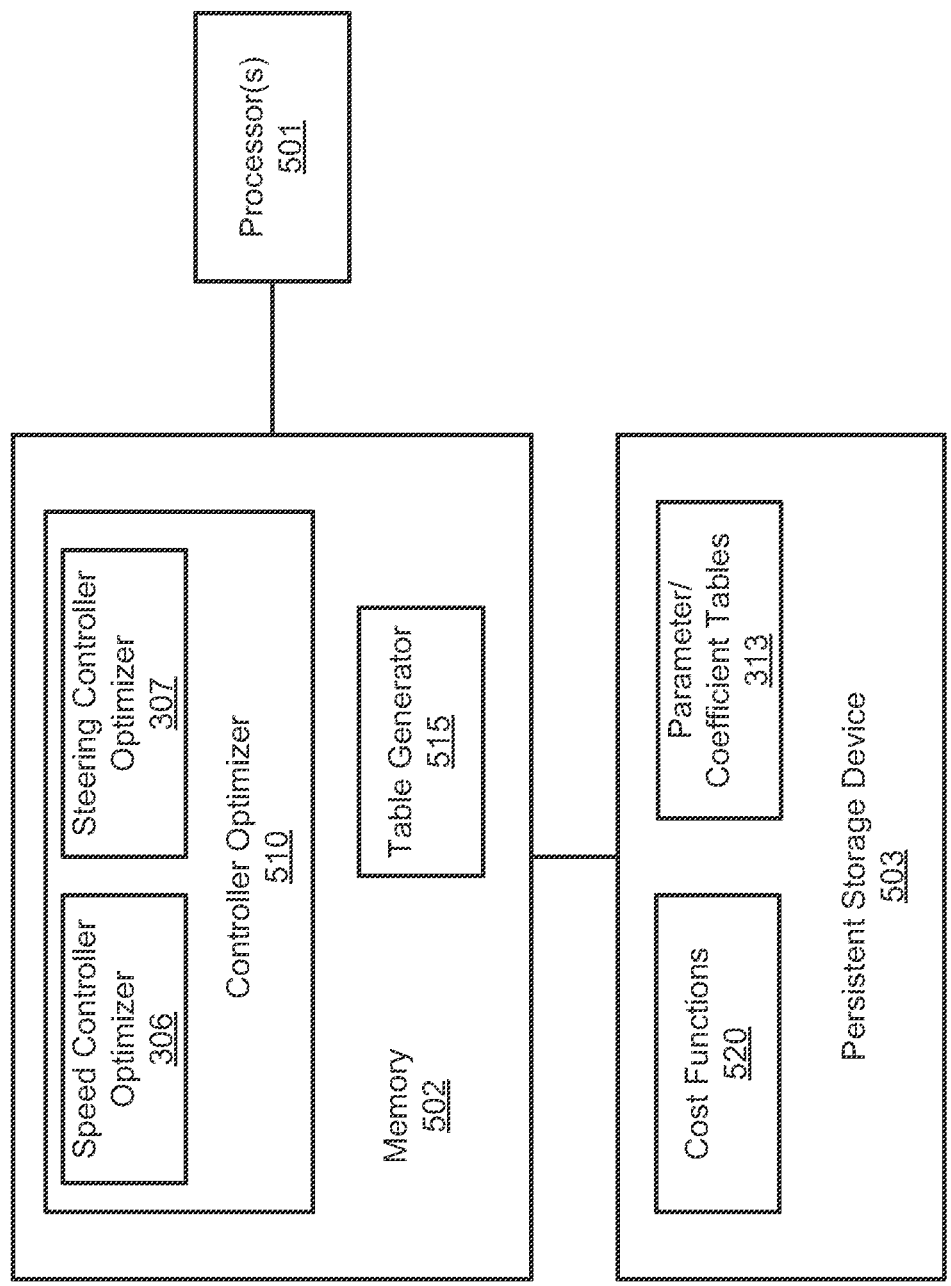
FIG. 5 is a block diagram illustrating a system for determining optimal controller coefficients according to one embodiment.

FIG. 5 is a block diagram illustrating an example of a data analytics system according to one embodiment. System 500 may be implemented as part of data analytics system 103. System 500 includes controller optimizer 510 to optimize controller coefficients for various controllers such as speed controller 306 and steering controller 307. Controller optimizer 510 may be loaded into memory 502 (e.g., volatile memory devices such as dynamic random access memory or DRAM devices) and executed by one or more processors 501. Controller optimizer 510 utilizes cost functions 520 stored in persistent storage device 503 (e.g., non-volatile storage devices such as hard disks) to determine the optimal controller coefficients for the controllers.

In one embodiment, controller optimizer 510 includes specific controller optimizers for various controllers including, for example, speed controller optimizer 511 and steering controller optimizer 512. Speed controller optimizer 511 is configured to determine a set of most optimal controller coefficients for speed controller 306 for various target speeds. Steering controller optimizer 512 is configured to determine a set of most optimal controller coefficients for steering controller 307 for various target heading directions. Table generator 515 generates parameter/coefficient mapping tables 313 based on the optimal controller coefficients provided by controller optimizer 510. Different tables may be generated for different controllers including, for example, a speed parameter/coefficient mapping table such as mapping table 400 of FIG. 4A and a steering parameter/coefficient mapping table such as mapping table 450 of FIG. 4B.

Figure 6A:
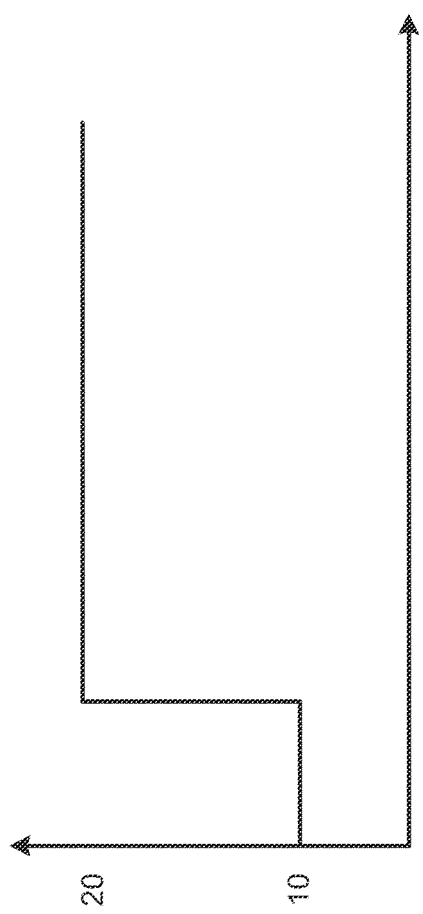
FIGS. 6A and 6B are diagrams illustrating effects of different controller coefficients on driving parameters.
Figure 6B:
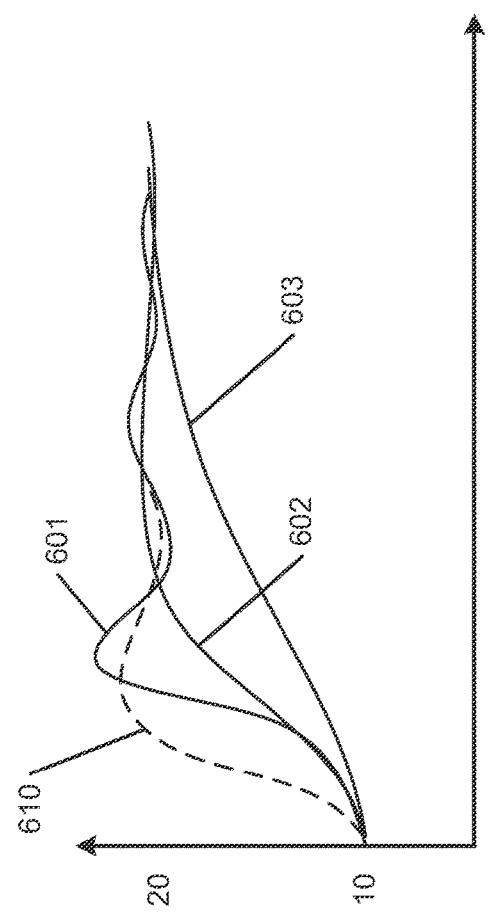

For example, when a target speed is to be changed from 10 m/s to 20 m/s, the ideal speed changing curve is shown in FIG. 6A. In order to change the speed of an ADV from 10 m/s to 20 m/s as close to the ideal curve as shown in FIG. 6A as possible, speed controller 306 is configured to control the ADV using the most optimal controller coefficients. Controller coefficients of speed controller 306 may affect how the speeds of ADV will change as shown in FIG. 6B. Referring to FIG. 6B, speed controller 306 with a different set of controller coefficients may cause the ADV to change the speed in different manners as shown in curves 601-603. If the most optimal controller coefficients can be determined and speed controller 306 is configured with the most optimal controller coefficients, the ADV can change its speed according to optimal curve 610 that is closest to the idea curve as shown in FIG. 6A. As shown in FIG. 6B, different curves have different shapes such as overshoots and settling time due to different sets of controller coefficients. The term of "overshoot" refers an amount of a driving parameter that exceeds the target driving parameter. A percentage of overshoot (% overshoot) refers to a percentage of the overshoot over the target driving parameter, i.e., (overshoot/target driving parameter)*100. In the example of curve 601, the overshoot is the difference between the highest peak and the target speed of 20. The term of "settling time" refers to the time the vehicle takes to reach and settle within a predetermined percentage of the target driving parameter. In this example, a two-percent settling time (2% settling time) refers to the time it takes to reach and settle within 2% of the target speed of 20. The most optimal curve would have the least overshoot and shortest settling time, i.e., closest to the curve as shown in FIG. 6A. By optimizing the controller coefficients, the most optimal curve can be obtained.

According to one embodiment, controller optimizer 510 determines the optimal controller coefficients using a particle swarm optimization. In computer science, particle swarm optimization (PSO) is a computational method that optimizes a problem by iteratively trying to improve a candidate solution with regard to a given measure of quality. It solves a problem by having a population of candidate solutions, here dubbed particles, and moving these particles around in the search-space according to simple mathematical formula over the particle's position and velocity. Each particle's movement is influenced by its local best known position, but is also guided toward the best known positions in the search-space, which are updated as better positions are found by other particles. This is expected to move the swarm toward the best solutions.

In applying the PSO approach to determine optimal controller coefficients, the controller coefficient candidates are divided into ranges or groups of controller coefficient candidates to form a number of local domains or local search spaces. For each of the local domains, a local best controller coefficient is searched and determined based on the controller coefficient candidates and a driving parameter representative or target driving parameter using a cost function. As described above, a driving parameter representative or target driving parameter represents a predetermined range of driving parameters such as speeds or heading directions. The local best controller coefficient represents the most optimal controller coefficient within the local domain. In addition, a global best controller coefficient is determined based on all of the local best controller coefficients of all the local domains. The global best controller coefficient refers to the most optimal controller coefficient of all the local domains, collectively referred to as a global domain.

According to one embodiment, for each of the target driving parameters, a set of controller coefficient candidates that are suitable for a controller of an ADV is determined. The controller coefficients are divided or grouped into a number of ranges (groups or segments) of controller coefficient candidates. Each range of controller coefficient candidates represents a local domain (a local space or local search space) and all ranges as a whole collectively represents a global domain (a global space or global search space). For each local domain, a local best controller coefficient is determined based on all the controller coefficient candidates associated with that local domain using a cost function, such that the cost reaches minimum. For a cost function of speed control, the cost of cost function is calculated based on a combination of an amount of overshoots and/or settling time of the speed changes of the vehicle. Thus, when the cost reaches minimum, the combination of overshoots and settling time reaches minimum.

In one embodiment, the cost function can be defined as follows:

$$\text{Cost} = A1(\%\text{ overshoot})^2 + A2(2\%\text{ settling time})^2$$

The term of "% overshoot" refers to the percentage of the overshoot compared to the corresponding target driving parameter (e.g., target speed or target heading direction). The term of "2% settling time" refers to the time the vehicle takes to reach and settle within 2% of the corresponding target driving parameter.

Based on the local best controller coefficients of all local domains, a global best controller coefficient is determined. The global best controller coefficient represents the most optimal controller coefficient amongst all of the local domains, i.e., the global domain. The global best controller coefficient is then associated with the target driving parameter, which can be inserted into a mapping entry of a parameter/coefficient mapping table such as table 400 or table 450 to be used in real-time or online for controlling the ADV. The processes may be iteratively performed to determine a global best controller coefficient of a particular controller for each of the target driving parameters.

Figure 7:
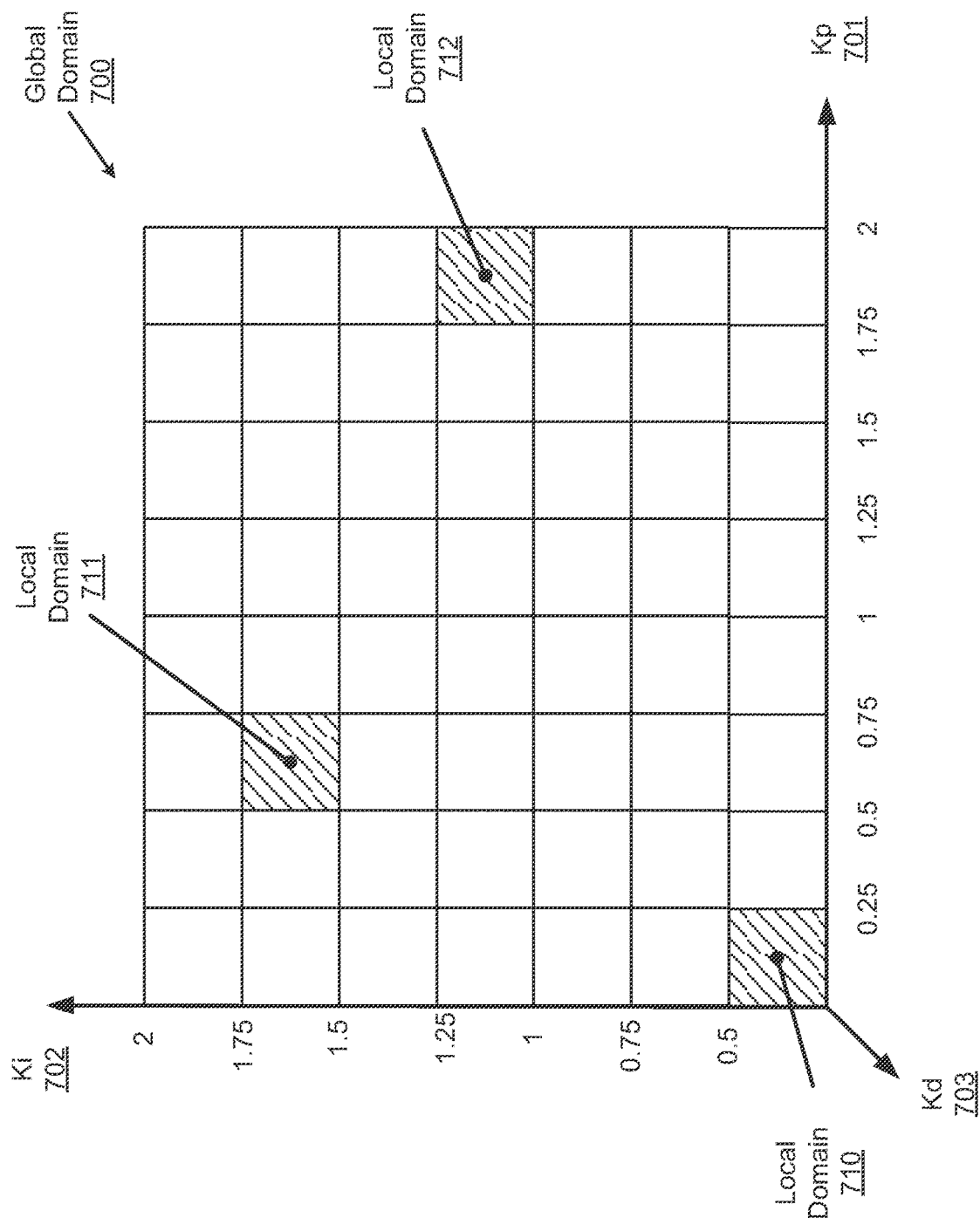
FIG. 7 shows a search space for searching local and global best controller coefficients according to one embodiment.

FIG. 7 shows a searching space for search and determine best controller coefficients using a particle swam optimization approach according to one embodiment. Referring to FIG. 7, in this example for the purpose of illustration only, the global domain (or global search space) 700 for determining optimal controller coefficients are divided into a number of local domains (or local search spaces). As shown in FIG. 7, the entire grid of grid cells is considered as global domain 700, while each of the individual grid cells is considered as a local domain. In this example, it is assumed a controller being targeted is a PID controller. For a PID controller, an optimal controller coefficient includes an optimal Kp, an optimal Ki, and an optimal Kd. There will be a local best set of Kp, Ki, and Kd for each local domain and a single global best set of Kp, Ki, and Kd for each of the driving parameter representative or range. The global best set of Kp, Ki, and Kd will be populated into a parameter/coefficient mapping table for the corresponding controller (e.g., tables 400 and 450).

Therefore, as shown in FIG. 7, a domain, either being a local domain or a global domain, is a three-dimensional (3D) domain, including Kp dimension or vector 701, Ki dimension/vector 702, and Kd dimension/vector 703. The size of each of dimensions 701-703 depends on a range of the corresponding coefficients Kp, Ki, and Kd that are likely utilized by a corresponding controller. In this example, it is assumed that each of the dimensions 701-703 is ranging from 0 to 2 for speed controller 306. The range of controller coefficients are divided or grouped into a number of groups, in this example, 0.25 by 0.25 by 0.25 3D grid cells, and each 3D grid cell represents a local domain. For example, local domain 710 would have a 3D space of (0-0.25, 0-0.25, 0-0.25) for Kp, Ki, and Kd, respectively. Local domain 711 would have a 3D space of (0.5-0.75, 1.25-1.5, 0-0.25), respectively. Local domain 712 would have a 3D space of (1.75-2, 0.75-1, 0-0.25), respectively.

For each target driving parameter representing a range of driving parameters (e.g., 0-10 m/s), a search is conducted within each of the local domains to derive a local best set of Kp, Ki, and Kd based on a set of Kp, Ki, and Kd candidates within the respective local domain. For example, for local domain 710, a set of Kp candidates such as 0, 0.05, 0.10, 0.15, . . . , and 0.25, a set of Ki candidates such as 0, 0.05, 0.10, 0.15, . . . , and 0.25, and a set of Kd candidates such as 0, 0.05, 0.10, 0.15, . . . , and 0.25 are utilized to search for a local best Kp, Ki, and Kd, respectively. In this example, although an increment of 0.05 is utilized to space apart between two adjacent coefficients, however, other increments may also be utilized. For example, in a particle swarm approach, a controller coefficient of a particular iteration may be updated using a predetermined formula based on the corresponding controller coefficient of a prior iteration in view of the current local best and global best controller coefficients. A global best set of Kp, Ki, and Kd is then determined from the local best sets of Kp, Ki, and Kd for the corresponding target driving parameter.

In one embodiment, for each set of Kp, Ki, and Kd candidates selected from the Kp, Ki, and Kd candidates within each local domain, a cost is iteratively calculated based on the selected Kp, Ki, and Kd candidates and the corresponding target speed using a predetermined cost function. A set of local best set of Kp, Ki, and Kd is determined such that the corresponding local best cost associated with the local best set of Kp, Ki, and Kd is minimized. Once the local best set of Kp, Ki, and Kd has been determined, the local best set is compared to a current global best set of Kp, Ki, and Kd. If the local best set is better than the current global best set (i.e., the local best cost is lower than the current global best cost), the local best set will replace the current global best set as the new global best set. When all of the local domains have been searched and their local best sets have been determined, the final global best set will be associated with the corresponding target speed and populated into the corresponding parameter/coefficient mapping table.

In one embodiment, during each iteration, the iteration rate can be determined based on the following function:

$$u(n+1)=w1*u(n)+w2*[pbest(n)-Kj]+w3*[gbest(n)-Kj]$$

where w1, w2, and w3 are constants as weight factors, which may be predetermined, for example, by data analytics system 103 based on driving statistics using machine learning algorithms. Weight factors w1, w2, and w3 may be configured differently for different target driving parameters (e.g., 0-10 m/s, 10-20 m/s).

In this example, the iteration rate u(n+1) of the next iteration (n+1) can be determined based on the iteration rate u(n) of the current iteration (n), the current local best controller coefficients pbest(n), the current global best controller coefficients gbest(n), and the current selected set of controller coefficient candidates Kj. The controller coefficient candidates for the next iteration Kj(n+1) can be updated based on the following function:

$$Kj(n+1)=Kj(n)+u(n+1)$$

For iteration (n+1), U(n+1) is the cost calculated based on target speed u(n), current local best set pbest(n) of Kp, Ki and Kd, current global best set gbest(n) of Kp, Ki and Kd, and Kj representing a currently selected candidates Kp, Ki and Kd, which were determined during a prior iteration (n). Note that for the purpose of illustration, Kj represents a set of Kp, Ki, and Kd.

In one embodiment, for a given target speed representing a range of speeds (e.g., 10-20 m/s), Kj, pbest, gbest are initially set to an initial values, and the initial local cost and global cost is set high. The selected controller coefficients candidates are then fed into a corresponding controller and the driving parameters are measured, for example, via simulation. The cost is then calculated and compared to the initial local cost. If the cost is lower than the current local cost, the current local best pbest will be replaced by the current Kj. If the cost is also lower than the current global cost, the current global gbest will be replaced by the current Kj. Otherwise, Kj is updated, for example, using the iteration rate updating formula as described above, and the above process is iteratively performed until all of the Kj candidates within the same local domain have been applied. In one embodiment, the cost may be calculated using a cost function based on the measured driving parameters. For example, for speeds of the vehicle, the cost function may be configured based on the amount of overshoot and settling time.

Once the local best Kj has been determined, the same process is iteratively performed to search for a local best pbest and global best gbest for other local domains (e.g., local domains 711-712) within the global domain 700. Once all of the local domains have been searched, the resulted global best set gbest of Kp, Ki, and Kd is determined and associated with the corresponding target speed. The above same process can be iteratively performed to determine the global best set of Kp, Ki, and Kd for each of the target speed ranges for speed controller 306. The global best controller coefficients are then populated into a speed parameter/coefficient mapping table such as table 400. The same or similar techniques can be utilized for determine the local best of controller coefficients and the global best set of controller coefficients for different ranges of target heading directions for steering parameter/coefficient mapping table 450 for steering controller 307.

Figure 8:
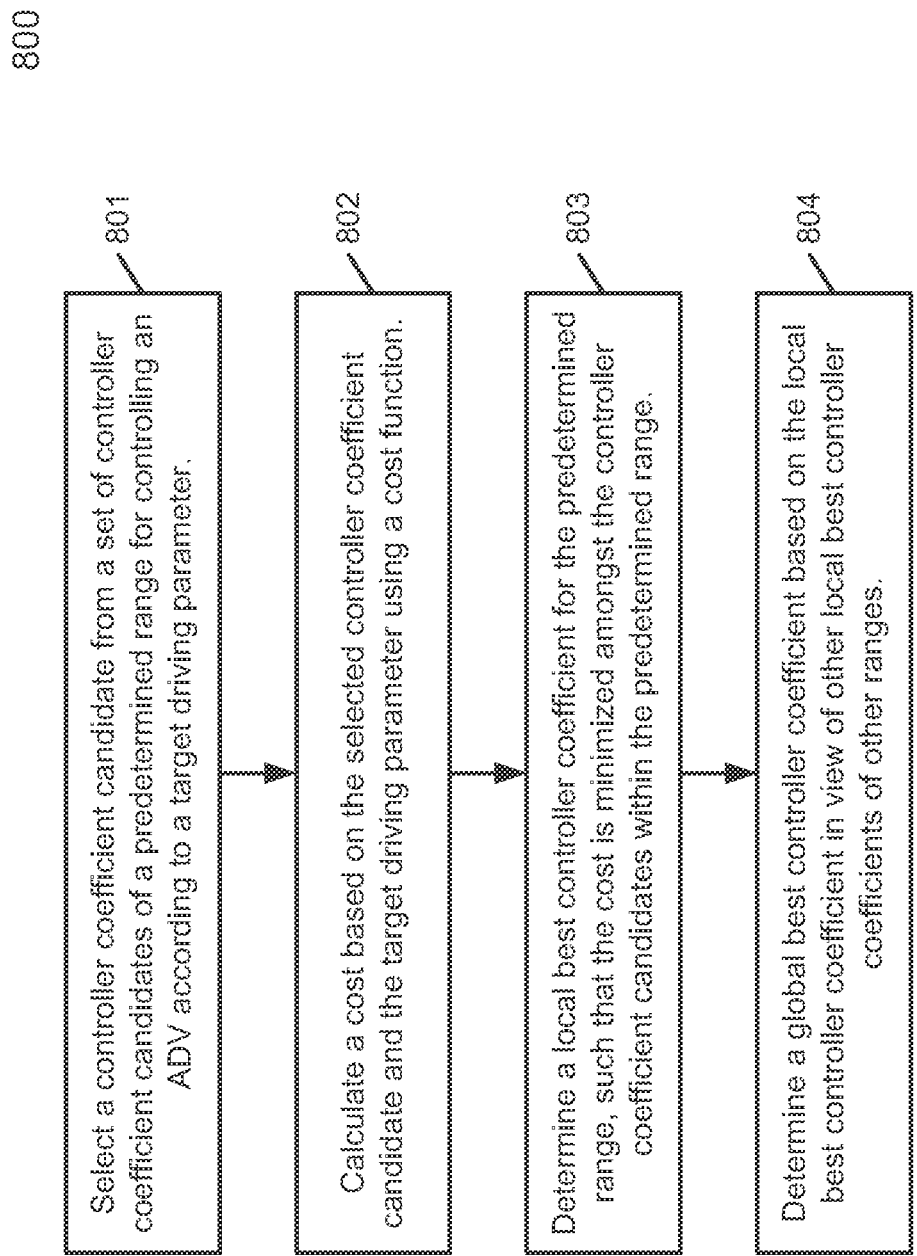
FIG. 8 is a flow diagram illustrating a process of determining optimal controller coefficients of a controller to control an autonomous driving vehicle according to one embodiment.

FIG. 8 is a flow diagram illustrating a process of determining optimal controller coefficients of a controller to control an autonomous driving vehicle according to one embodiment. Process 800 may be performed by processing logic which may include software, hardware, or a combination thereof. For example, process 800 may be performed by controller optimizer 510 of FIG. 5. Referring to FIG. 8, in operation 801, processing logic selects a controller coefficient from a set of controller coefficient candidates of a predetermined range for controlling an ADV to drive according to a target driving parameter (e.g., a target speed, target heading direction). The predetermined range represents one of a number of local domains or local search spaces of a global domain or global search space. In operation 802, processing logic calculates a cost based on the selected controller coefficient candidate and the target driving parameter of the ADV using a cost function. In operation 803, processing logic determines a local best controller coefficient for the predetermined range, such that the cost is minimized amongst the controller coefficients within the predetermined range. In operation 804, a global best controller coefficient for the global domain is determined based on the local best controller coefficient in view of other local best controller coefficients of remaining ranges of controller coefficient candidates. The global controller coefficient is then populated into a parameter/coefficient mapping table for the corresponding controller.

Figure 9:
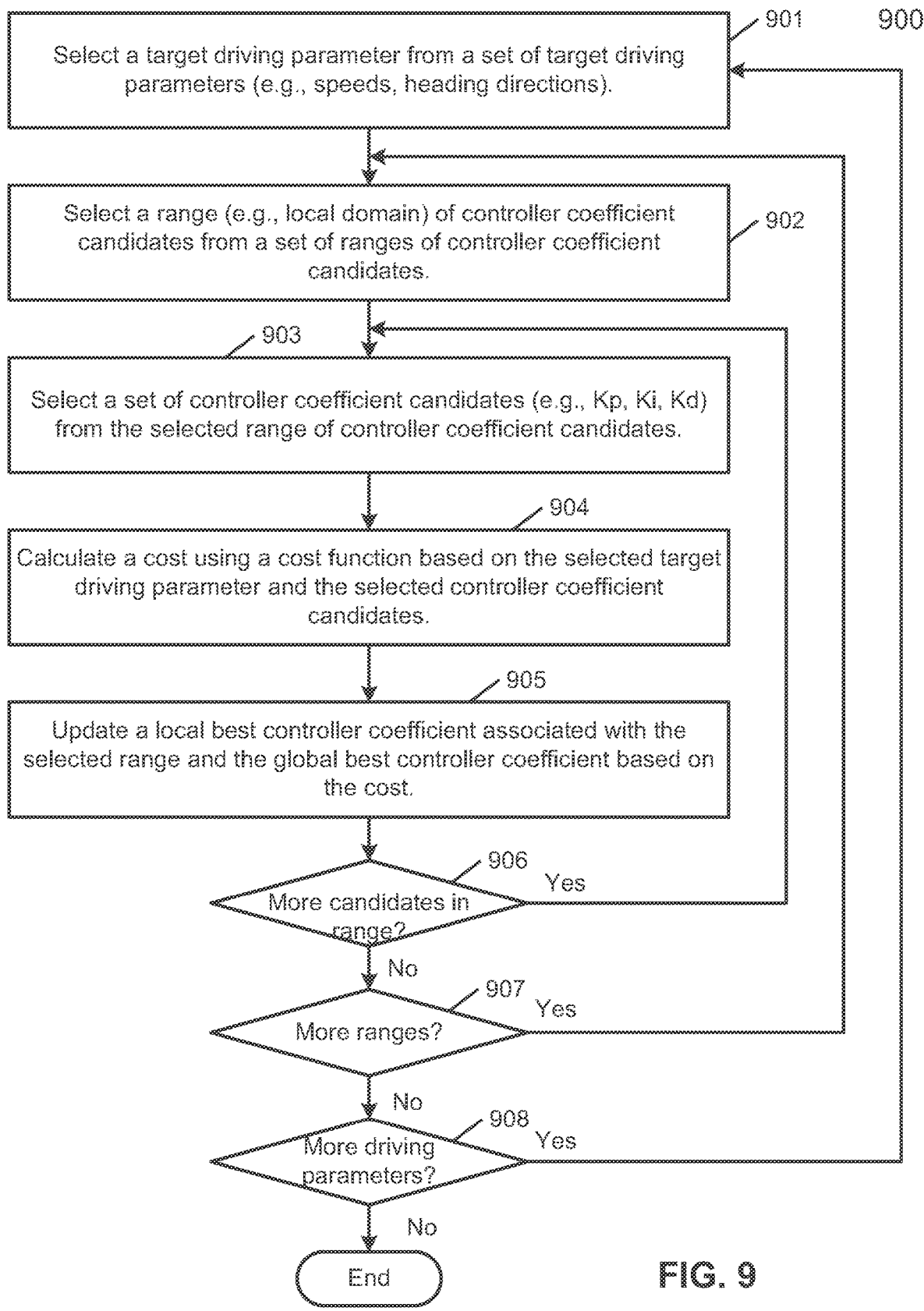
FIG. 9 is a flow diagram illustrating a process of determining optimal controller coefficients of a controller to control an autonomous driving vehicle according to another embodiment.

FIG. 9 is a flow diagram illustrating a process of determining optimal controller coefficients of a controller to control an autonomous driving vehicle according to one embodiment. Process 900 may be performed by processing logic which may include software, hardware, or a combination thereof. For example, process 900 may be performed by controller optimizer 510 of FIG. 5. Referring to FIG. 9, in operation 901, processing logic selects a target driving parameter from a set of predetermined target driving parameter. Each target driving parameter represents a range of driving parameters (e.g., speed ranges of 0-10 m/s, 10-20 m/s). In operation 902, processing logic selects a range of controller coefficient candidates, where the range of controller coefficient candidates represents one of the local domains that collectively constitute the global domain.

In operation 903, processing logic selects a set of controller coefficient candidates from the selected range of controller coefficient candidates. In operation 904, a cost is calculated using a cost function based on the selected target driving parameter, selected controller coefficient candidates in view of current local best controller coefficients and current global best controller coefficients. In operation 905, the local best controller coefficients and the global best controller coefficients are updated based on the cost. In one embodiment, if the cost associated with the currently selected controller coefficient candidate is lower than the cost associated with the current local best controller coefficient, the currently selected controller coefficient candidate will replace the local best controller coefficient as the new local best controller coefficient. Similarly, if the cost associated with the currently selected controller coefficient candidate is lower than the cost associated with the current global best controller coefficient, the currently selected controller coefficient candidate will replace the global best controller coefficient as the new global best controller coefficient.

In operation 906, if there are more controller coefficient candidates remained in the currently selected range, the operations 903-905 are iteratively performed for the selected range, until no more candidates are remained or the cost cannot be lower. In one embodiment, the coefficient candidates are updated using an iteration rate function (e.g., u(n+1)) as described above prior to iteratively performing operations 903-905. Once the controller coefficient candidates of the current range have been processed, in operation 907, if there are more ranges remained to be processed, operations 902-905 are iteratively performed for the remaining ranges. Once the global best controller coefficients have been determined for the selected target driving parameter, in operation 908, if there are more target driving parameters remained to be processed (e.g., more speed ranges remained), operations 901-905 are iteratively performed for the remaining target driving parameters.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
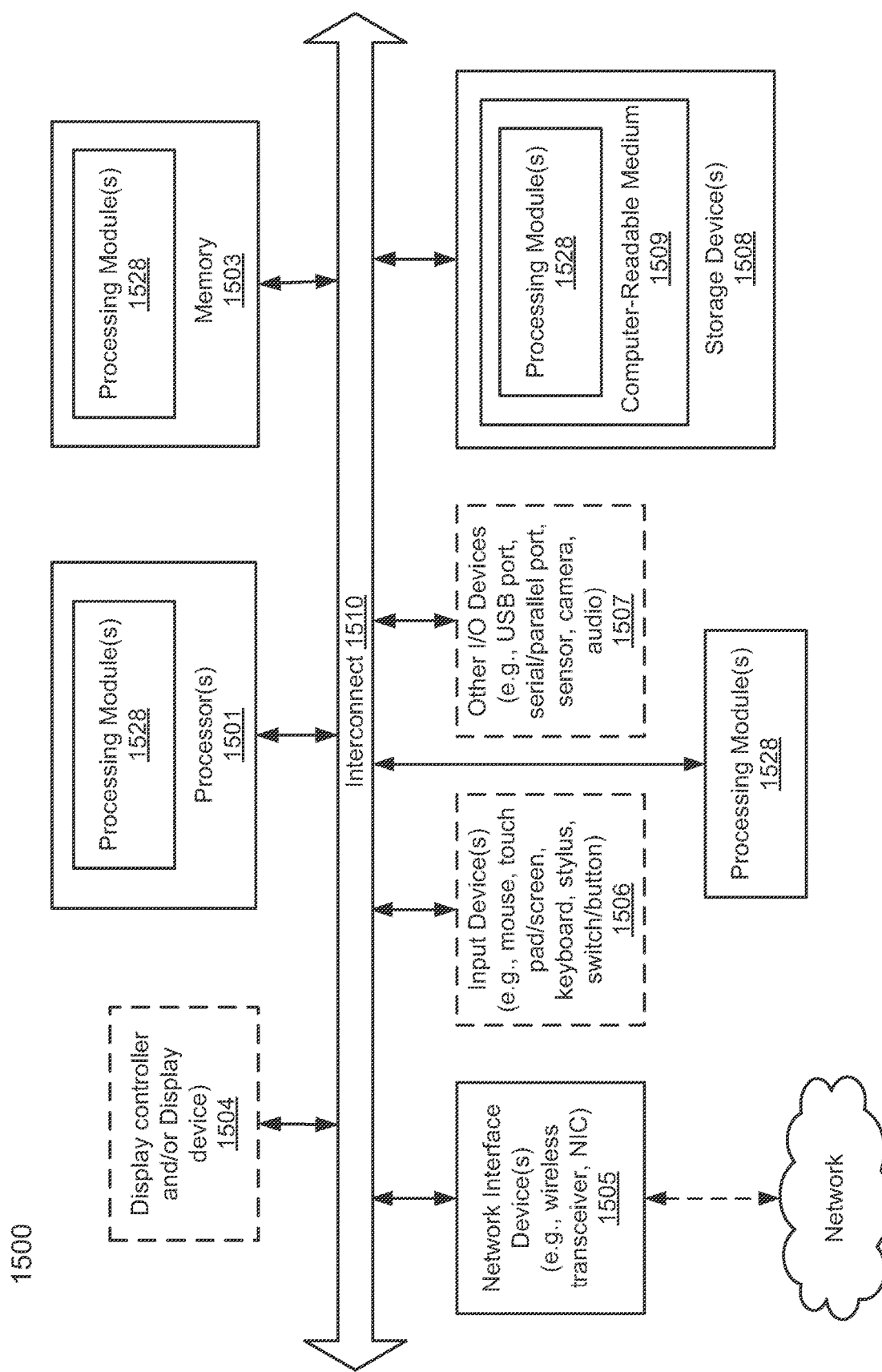
FIG. 10 is a block diagram illustrating a data processing system according to one embodiment.

FIG. 10 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304, control module 305, or controller optimizer 510. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining coefficients of a controller for controlling an autonomous driving vehicle (ADV), the method comprising:
   selecting a plurality of target driving parameters in a plurality of predetermined ranges, a first target driving parameter of the plurality of target driving parameters representing driving parameters in a first predetermined range of the plurality of predetermined ranges:
   selecting a controller coefficient candidate from a set of controller coefficient candidates within the first predetermined range for controlling the ADV to drive based on the first target driving parameter;
   calculating a cost using a cost function based on the selected controller coefficient candidate and the first target driving parameter;
   determining a local best controller coefficient for the first predetermined range, such that the cost is minimized amongst the controller coefficient candidates of the set of the first predetermined range; and
   determining a global best controller coefficient based on the local best controller coefficient in view of other local best controller coefficients of other ranges of controller coefficient candidates, wherein the global best controller coefficient is utilized by the controller to control the ADV with the first target driving parameter.

2. The method of claim 1, wherein for each of the predetermined ranges, the method further comprises performing calculating a cost using the cost function and determining a local best controller coefficient for the respective predetermined range.

3. The method of claim 2, wherein the first target driving parameter represents one of a plurality of driving parameters, and wherein for each of the driving parameters, the method further comprises performing calculating a cost using the cost function, determining a local best controller coefficient for each of the plurality of predetermined ranges, and determining a global best controller coefficient for the respective driving parameter.

4. The method of claim 3, wherein each of the driving parameters represents a range of driving parameter values.

5. The method of claim 1, wherein determining a local best controller coefficient for the predetermined range comprises:
comparing the cost associated with the selected controller coefficient candidate with a current local best cost associated with a current local best controller coefficient of the first predetermined range; and
in response to determining that the cost associated with the selected controller coefficient candidate is lower than the local best cost associated with the current local best controller coefficient,
replacing the current local best controller coefficient with the selected controller coefficient candidate, and
replacing the current local best cost with the cost associated with the selected controller coefficient candidate.

6. The method of claim 1, wherein determining a global best controller coefficient based on the local best controller coefficient comprises:
comparing the cost associated with the selected controller coefficient candidate with a global best cost associated with a current global best controller coefficient; and
in response to determining that the cost associated with the selected controller coefficient candidate is lower than the global best cost associated with the current global best controller coefficient,
replacing the current global best controller coefficient with the selected controller coefficient candidate, and
replacing the global best cost with the cost associated with the selected controller coefficient candidate.

7. The method of claim 1, wherein each of the controller coefficient candidates represents at least one of Kp, Ki, or Kd of a proportional-integral-derivative controller (PID) controller.

8. The method of claim 1, wherein the first target driving parameter is one of a target speed or a heading direction of the ADV.

9. The method of claim 1, further comprising generating a driving parameter to controller coefficient mapping (parameter/coefficient) table to be used to configure a controller for driving the ADV with a similar target driving parameter, wherein the parameter/coefficient table includes a plurality of mapping entries, each mapping entry mapping a particular driving parameter to a particular controller coefficient.

10. A non-transitory machine-readable medium having instructions stored therein, which when executed by a processor, cause the processor to perform operations of determining optimal controller coefficients, the operations comprising:
selecting a plurality of target driving parameters in a plurality of predetermined ranges, a first target driving parameter of the plurality of target driving parameters representing driving parameters in a first predetermined range of the plurality of predetermined ranges;
selecting a controller coefficient candidate from a set of controller coefficient candidates within the first predetermined range for controlling the ADV to drive based on the first target driving parameter;
calculating a cost using a cost function based on the selected controller coefficient candidate and the first target driving parameter;
determining a local best controller coefficient for the first predetermined range, such that the cost is minimized amongst the controller coefficient candidates of the set of the first predetermined range; and
determining a global best controller coefficient based on the local best controller coefficient in view of other local best controller coefficients of other ranges of controller coefficient candidates, wherein the global best controller coefficient is utilized by the controller to control the ADV with the first target driving parameter.

11. The machine-readable medium of claim 10, wherein for each of the predetermined ranges, the method further comprises performing calculating a cost using the cost function and determining a local best controller coefficient for the respective predetermined range.

12. The machine-readable medium of claim 11, wherein the first target driving parameter represents one of a plurality of driving parameters, and wherein for each of the driving parameters, the method further comprises performing calculating a cost using the cost function, determining a local best controller coefficient for each of the plurality of predetermined ranges, and determining a global best controller coefficient for the respective driving parameter.

13. The machine-readable medium of claim 12, wherein each of the driving parameters represents a range of driving parameter values.

14. The machine-readable medium of claim 10, wherein determining a local best controller coefficient for the predetermined range comprises:
comparing the cost associated with the selected controller coefficient candidate with a current local best cost associated with a current local best controller coefficient of the first predetermined range; and
in response to determining that the cost associated with the selected controller coefficient candidate is lower than the local best cost associated with the current local best controller coefficient,
replacing the current local best controller coefficient with the selected controller coefficient candidate, and
replacing the current local best cost with the cost associated with the selected controller coefficient candidate.

15. The machine-readable medium of claim 10, wherein determining a global best controller coefficient based on the local best controller coefficient comprises:
comparing the cost associated with the selected controller coefficient candidate with a global best cost associated with the current global best controller coefficient; and
in response to determining that the cost associated with the selected controller coefficient candidate is lower than the global best cost associated with the current global best controller coefficient,
replacing the current global best controller coefficient with the selected controller coefficient candidate, and
replacing the global best cost with the cost associated with the selected controller coefficient candidate.

16. The machine-readable medium of claim 10, wherein each of the controller coefficient candidates represents at least one of Kp, Ki, or Kd of a proportional-integral-derivative controller (PID) controller.

17. The machine-readable medium of claim 10, wherein the first target driving parameter is one of a target speed or a heading direction of the ADV.

18. The machine-readable medium of claim 10, wherein the operations further comprise generating a driving parameter to controller coefficient mapping (parameter/coefficient) table to be used to configure a controller for driving the ADV with a similar target driving parameter, wherein the parameter/coefficient table includes a plurality of mapping entries, each mapping entry mapping a particular driving parameter to a particular controller coefficient.

19. A data processing system, comprising:
a processor; and
a memory coupled to the processor to store instructions, which when executed by the processor, cause the processor to perform operations of determining controller coefficients, the operations including
   selecting a plurality of target driving parameters in a plurality of predetermined ranges, a first target driving parameter of the plurality of target driving parameters representing driving parameters in a first predetermined range of the plurality of predetermined ranges;
   selecting a controller coefficient candidate from a set of controller coefficient candidates within the first predetermined range for controlling the ADV to drive based on the first target driving parameter,
   calculating a cost using a cost function based on the selected controller coefficient candidate and the first target driving parameter,
   determining a local best controller coefficient for the first predetermined range, such that the cost is minimized amongst the controller coefficient candidates of the set of the first predetermined range, and
   determining a global best controller coefficient based on the local best controller coefficient in view of other local best controller coefficients of other ranges of controller coefficient candidates, wherein the first target driving parameter represents a range of driving parameter values, and the global best controller coefficient is utilized by the controller to control the ADV with the first target driving parameter.

20. The system of claim 19, wherein for each of the predetermined ranges, the method further comprises performing calculating a cost using the cost function and determining a local best controller coefficient for the respective predetermined range.

21. The system of claim 20, wherein the first target driving parameter represents one of a plurality of driving parameters, and wherein for each of the driving parameters, the method further comprises performing calculating a cost using the cost function, determining a local best controller coefficient for each of the plurality of predetermined ranges, and determining a global best controller coefficient for the respective driving parameter.

22. The system of claim 21, wherein each of the driving parameters represents a range of driving parameter values.

* * * * *